United States Patent
Lin et al.

(10) Patent No.: US 10,322,770 B1
(45) Date of Patent: Jun. 18, 2019

(54) ELECTRICITY AIDED BICYCLE AND AUXILIARY POWER CONTROLLING METHOD THEREOF

(71) Applicant: Metal Industries Research & Development Centre, Kaohsiung (TW)

(72) Inventors: Chang-Ching Lin, Kaohsiung (TW); Cheng-Yen Chen, Kaohsiung (TW); I-Chiao Tsai, Kaohsiung (TW)

(73) Assignee: Metal Industries Research & Development Centre, Kaohsiung (TW)

( * ) Notice: Subject to any disclaimer, the term of this patent is extended or adjusted under 35 U.S.C. 154(b) by 0 days.

(21) Appl. No.: 15/822,211

(22) Filed: Nov. 27, 2017

(51) Int. Cl.
| | | |
|---|---|---|
| *B62M 6/50* | (2010.01) | |
| *B60L 15/20* | (2006.01) | |
| *H02P 31/00* | (2006.01) | |

(52) U.S. Cl.
CPC .............. *B62M 6/50* (2013.01); *B60L 15/20* (2013.01); *H02P 31/00* (2013.01); *B60L 2200/12* (2013.01); *B60L 2240/427* (2013.01)

(58) Field of Classification Search
CPC ............ B62M 6/50; B60L 15/20; H02P 31/00
USPC .......................................................... 701/22
See application file for complete search history.

(56) References Cited

U.S. PATENT DOCUMENTS

| | | |
|---|---|---|
| 5,777,442 A | 7/1998 | Miyata |
| 9,376,164 B2 | 6/2016 | Tanaka et al. |
| 2005/0098978 A1* | 5/2005 | Kitamura ............. B62M 25/045 280/260 |
| 2010/0131164 A1* | 5/2010 | Carter ................. B60L 11/1805 701/61 |
| 2014/0039741 A1 | 2/2014 | Tanaka et al. |
| 2016/0159433 A1* | 6/2016 | Nishikawa ............... B62M 6/50 701/22 |

FOREIGN PATENT DOCUMENTS

| | | |
|---|---|---|
| CN | 1153499 | 7/1997 |
| EP | 0590674 | 1/1998 |
| JP | 2014139067 | 7/2014 |
| TW | 201620776 | 6/2016 |

OTHER PUBLICATIONS

"Office Action of Taiwan Counterpart Application", dated Aug. 31, 2018, p. 1-p. 10.

* cited by examiner

*Primary Examiner* — Yazan A Soofi
(74) *Attorney, Agent, or Firm* — JCIPRNET

(57) ABSTRACT

An electricity aided bicycle and an auxiliary power controlling method thereof are provided. The electricity aided bicycle includes a driving circuit, a rotating speed detector and a command voltage generator. The driving circuit receives a command voltage, and drives an auxiliary motor of the electricity aided bicycle based on the command voltage. The rotating speed detector generates a detection signal having a plurality of pulses based on a rotation status of a driving gear of the electricity aided bicycle. The command voltage generator receives the detection signal, and is configured to: calculate times between two adjacent pulses in the detection signal, operate numerical value derivation operation based on the times to generate an estimated velocity value, set an electricity aid strategy table and calculate the command voltage based on the estimated velocity value and the electricity aid strategy table.

14 Claims, 4 Drawing Sheets

ELECTRICITY AIDED BICYCLE AND AUXILIARY POWER CONTROLLING METHOD THEREOF

BACKGROUND OF THE INVENTION

1. Field of the Invention

The invention relates to an electricity aided bicycle, and particularly relates to an auxiliary power controlling method for an electricity aided bicycle capable of calculating a reliable estimated speed.

2. Description of Related Art

In the design of control over an auxiliary motor of an electricity aided bicycle in the known art, the velocity is detected and converted into a pedaling torque force based on Newton's Second Law of Motion (F=ma), and an auxiliary force is supplied at a ratio of 1:1. However, based on such calculation, an unstable detection signal may be obtained through the velocity detection in the known art when the user rides uphill or on an unstable ground. In the obtained detection signal, the acceleration (a) may be discontinuous values, so the pedaling force (F) obtained through calculation is also unstable. Hence, the auxiliary motor of the electricity aided bicycle is unable to output an optimal auxiliary force to properly help the user. Also, when there is a greater error in the calculation of the pedaling force, the auxiliary force output by the auxiliary motor may be excessive, and such power may disturb or even hurt the user.

SUMMARY OF THE INVENTION

One or some embodiments of the invention provides an electricity aided bicycle and an auxiliary power controlling method thereof capable of providing a stable auxiliary force when a movement velocity is low.

An electricity aided bicycle according to an embodiment of the invention includes a driving circuit, a rotating speed detector and a command voltage generator. The driving circuit receives a command voltage, and drives an auxiliary motor of the electricity aided bicycle based on the command voltage. The rotating speed detector generates a detection signal having a plurality of pulses based on a rotation status of a driving gear of the electricity aided bicycle. The command voltage generator is coupled to the rotating speed detector and the driving circuit. The command voltage generator receives the detection signal, and is configured to: calculate times between two adjacent pulses in the detection signal, operate numerical value derivation operation based on the times to generate an estimated velocity value, set an electricity aid strategy table and calculate the command voltage based on the estimated velocity value and the electricity aid strategy table. The electricity aid strategy table records a relation between an electricity aid ratio and the estimated velocity value.

An auxiliary power controlling method according to an embodiment of the invention is adapted for an electricity aided bicycle. The controlling method includes: generating a detection signal having a plurality of pulses based on a rotation status of a driving gear of the electricity aided bicycle; calculating a plurality of times between two adjacent pulses in the pulses of the detection signal; performing a numerical value derivation operation based on the times to generate an estimated velocity value; and setting an electricity aid strategy table to calculate the command voltage based on the estimated velocity value and the electricity aid strategy table. In addition, the electricity aid strategy table records a relation between an electricity aid ratio and the estimated velocity value.

Based on the above, in the embodiments of the invention, the detection signal is generated by detecting the rotation status of the driving gear, the times between the adjacent pulses in the detection signal are calculated, and the numerical value derivation operation is performed based on the times to obtain the estimated velocity value. In addition, the command voltage is calculated based on the estimated velocity value with reference to the electricity aid strategy table. Accordingly, a stable command voltage may be generated under a condition that the electricity aided bicycle is at a low movement velocity, and the auxiliary motor may generate a stable auxiliary power to make riding more comfortable.

To make the above features and advantages of the invention more comprehensible, embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
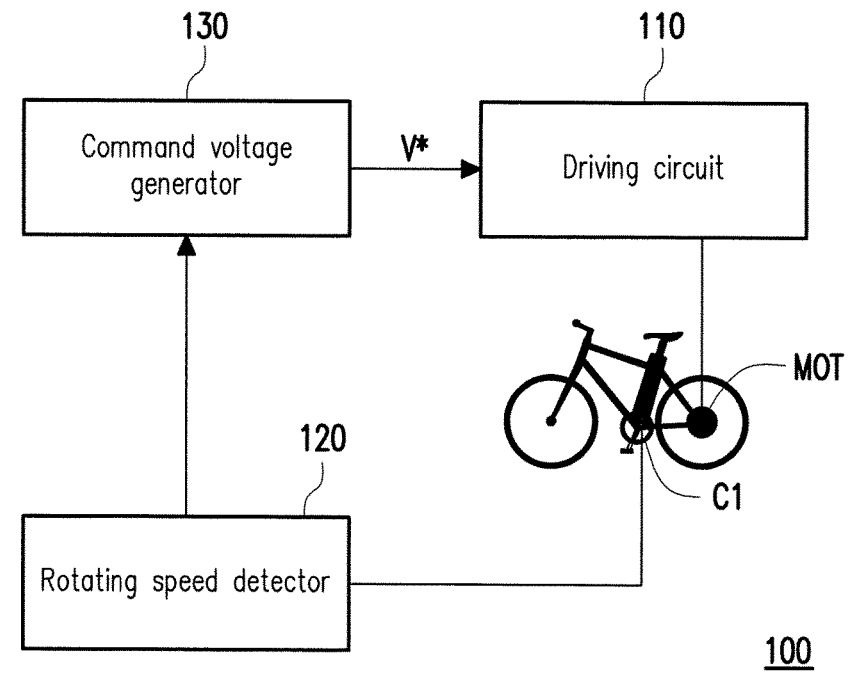
FIG. 1 is a block diagram illustrating an electricity aided bicycle according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Referring to FIG. 1, FIG. 1 is a block diagram illustrating an electricity aided bicycle according to an embodiment of the invention. An electricity aided bicycle 100 includes a driving circuit 110, a rotating speed detector 120, and a command voltage generator 130. The driving circuit 110 is coupled to an auxiliary motor MOT of the electricity aided bicycle 100, receives a command voltage V*, and drives the auxiliary motor MOT of the electricity aided bicycle 100 based on the command voltage V*. The rotating speed detector 120 detects a rotation status of a driving gear C1 of the electricity aided bicycle 100 and generates a detection signal DS based on the rotation status of the driving gear C1 of the electricity aided bicycle 100. Moreover, the detection signal DS has a plurality of pulses. More specifically, when the driving gear C1 of the electricity aided bicycle 100 rotates through pedaling of a rider, a pulse is generated in the detection signal DS in correspondence to each time when a rotation angle of the driving gear C1 exceeds a predetermined angle. In other words, a fixed number of pulses are generated in the detection signal DS after one cycle of rotation of the driving gear C1.

Besides, in the embodiments of the invention, the command voltage generator 130 is coupled to the rotating speed detector 120 and the driving circuit 110. The command voltage generator 130 receives the detection signal DS through the rotation detector 120. In addition, the command voltage generator 130 calculates times between two adjacent pulses in the pulses of the detection signal DS and performs a numerical value derivation operation based on the plurality of times obtained, so as to generate an estimated velocity value. The command voltage generator 130 also sets an electricity aid strategy table and calculates the command voltage V* based on the estimated velocity value and the electricity aid strategy table. The electricity aid strategy table records a relation between an electricity aid ratio and the estimated velocity value.

Figure 2:
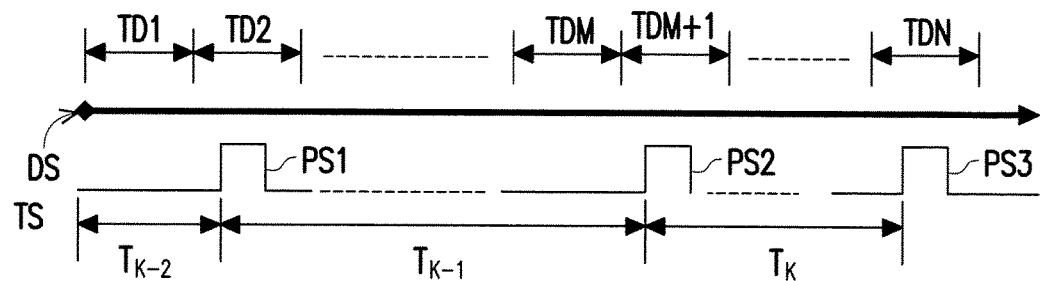
FIG. 2 is a schematic view illustrating signal detection according to an embodiment of the invention.

To be more specific, referring to FIGS. 1 and 2, FIG. 2 is a schematic view illustrating signal detection according to an embodiment of the invention. During an initial period when the electricity aided bicycle is being started, or when the electricity aided bicycle is ridden uphill or on a non-flattened ground, the rotation of the driving gear C1 may not be smooth and may be discontinuous. Thus, in the continuous pulses generated in the detection signal DS, the times between two adjacent pulses are not the same. A detection cycle with a fixed time interval may be set by the command voltage generator 130. Based on the set detection cycle, the command voltage generator 130 may periodically detect whether a pulse is generated in the detection signal DS. in FIG. 2, starting from a detection starting point TS, the command voltage generator 130 may continuously detect whether a pulse is generated in the detection signal DS in a plurality of detection time intervals TD1 to TDN. In addition, lengths of the time intervals TD1 to TDN are fixed and equivalent to the set detection cycle. According to an embodiment of the invention, the detection cycle may be set at one millisecond. Of course, in other embodiments of the invention, the detection cycle may be set differently by the designer based on an actual status of the electricity aided bicycle without any specific limitation.

In the time interval TD1, no pulse is generated in a detection signal DS1. In the subsequent time interval TD2, a pulse PS1 is generated in the detection signal DS1. Under the circumstance, the command voltage generator 130 may calculate time required from the starting point TS to the time when the pulse PS1 is generated to obtain a time $T_{K-2}$.

The command voltage generator 130 may continuously detect the detection signal DS1, and detect a second pulse PS2 of the detection signal DS1 in a time interval $TD_{M+1}$. Then, the command voltage generator 130 may calculate time required between the pulse PS1 and the pulse PS2 to obtain a time $T_{K-1}$. Then, the command voltage generator 130 continuously detects the detection signal DS1, and detect a third pulse PS3 of the detection signal DS1 in a time interval $TD_N$. The command voltage generator 130 thus calculates time between the pulse PS2 and the pulse PS3 to obtain a time $T_K$.

After obtaining the times $T_{K-2}$, $T_{K-1}$, and $T_K$, the command voltage generator 130 may perform the numerical value derivation operation based on the times $T_{K-2}$, $T_{K-1}$, and $T_K$ to generate the estimated velocity value accordingly. In an embodiment of the invention, the command voltage generator 130 may calculate an estimated velocity value VE based on the times $T_{K-2}$, $T_{K-1}$, and $T_K$ and reciprocals (inverse elements of multiplication) of the times $T_{K-2}$, $T_{K-1}$, and $T_K$. The calculation may be represented in Formula (1) below:

$$VE = \frac{1}{T_K} + \frac{1}{2}\left[\frac{1}{T_K} - \frac{1}{T_{K-1}}\right] + \frac{T_K}{8}\left[\frac{\frac{1}{T_K} - \frac{1}{T_{K-1}}}{T_K} - \frac{\frac{1}{T_{K-1}} - \frac{1}{T_{K-2}}}{T_{K-1}}\right] \quad (1)$$

The command voltage generator 130 may continuously detect the detection signal DS. In addition, under a condition that new pulses are continuously generated in the detection signal DS, the command voltage generator 130 may perform the numerical value derivation operation based on the latest three sequential times to generate the latest estimated velocity value VE.

Besides, generating the estimated velocity value by performing the numerical value derivation operation based on the three times $T_{K-2}$, $T_{K-1}$, and $T_K$ is merely described as an example. The numerical value derivation operation in the embodiments of the invention may be performed based on a greater number of times.

In the following, details about the electricity aid strategy table are described. The electricity aid strategy table may be set in a memory apparatus, and the memory apparatus may be built in or externally connected to the command voltage generator 130. In an embodiment, the electricity aid strategy table may be in the form of a lookup table and record the relation between the electricity aid ratio and the estimated velocity value VE. The electricity aid strategy table indicates the amount of auxiliary power that the auxiliary motor MOT is required to generate. When the electricity aid ratio is higher, the auxiliary motor MOT is required to generate more auxiliary power. When the electricity aid ratio is lower, the auxiliary motor MOT is required to generate less auxiliary power. In the electricity aid strategy table, the electricity aid ratio is negatively proportional to the estimated velocity value VE.

Figure 3:
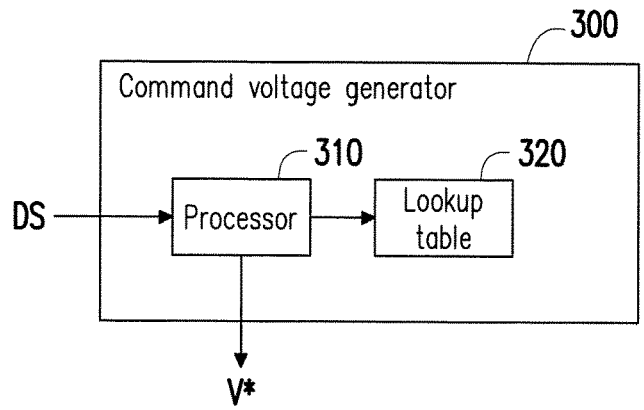
FIG. 3 is a schematic view illustrating a command voltage generator according to an embodiment of the invention.

Referring to FIG. 3, FIG. 3 is a schematic view illustrating a command voltage generator according to an embodiment of the invention. A command voltage generator 300 includes a processor 310 and a lookup table 320. The processor 310 receives the detection signal DS and is coupled to the lookup table 320. The electricity aid strategy table is recorded in the lookup table 320. The processor 310 detects a pulse generation state in the detection signal DS and obtains a plurality of times between adjacent pulses. Then, the numerical value derivation operation is then performed continuously based on the times, so as to generate the estimated velocity value VE. Based on the estimated velocity value VE, the processor 310 performs a lookup operation in the lookup table 320 and obtains the electricity aid ratio corresponding to the estimated velocity value VE. The processor 310 also generates the command voltage V* based on the electricity aid ratio.

Figure 4:
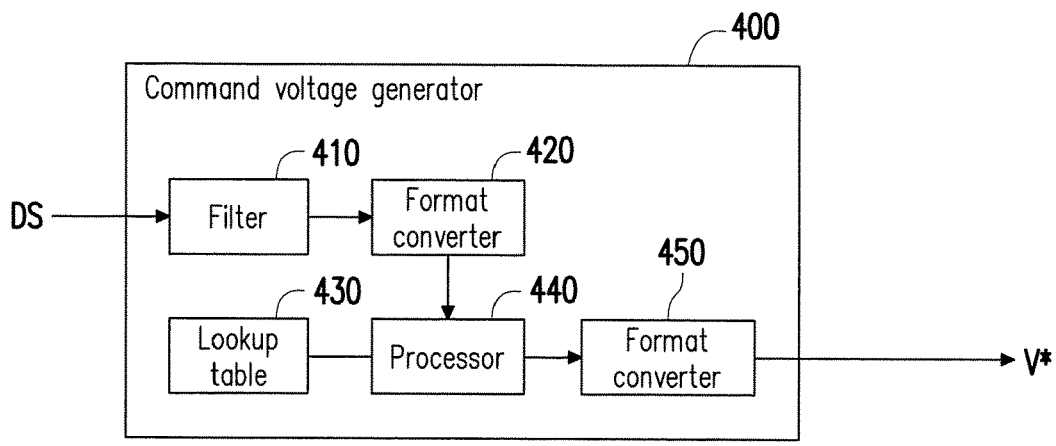
FIG. 4 is a schematic view illustrating a command voltage generator according to another embodiment of the invention.

Referring to FIG. 4, FIG. 4 is a schematic view illustrating a command voltage generator according to another embodiment of the invention. A command voltage generator 400 includes a filter 410, format converters 420 and 450, a lookup table 430, and a processor 440. The filter 410 receives the detection signal DS and filters out noises of the detection signal DS. The filtered detection signal DS is transmitted to the format converter 420 for signal format conversion. In the embodiment, the format converter 420 is an analog-to-digital converter.

The processor 440 receives a detection signal in a digital format, and generates the command voltage based on the electricity aid strategy table in the lookup table 430. The format converter 450 converts the signal format of the command voltage generated by the processor 440 to generate the command voltage V* in an analog format. In the embodiment, the format converter 450 is a digital-to-analog converter.

In the embodiments shown in FIGS. 3 and 4, the processors 310 and 440 may be processors having a computing capability. Alternatively, the processors 310 and 440 may be hardware circuits designed based on the hardware description language (HDL) or any other digital circuit design methods that people having ordinary skill in the art are familiar with and implemented in the form of field programmable gate array (FPGA), complex programmable logic device (CPLD), or application-specific integrated circuit (ASIC).

The lookup tables 320 and 430 may be implemented in any memory apparatuses that people having ordinary skills in the art are familiar with, such as memories in an arbitrary form. The filter 410 may be implemented as a filter circuit that people having ordinary skills in the art are familiar with. Also, the format converters 420 and 450 may be implemented as any analog-to-digital converter circuits and digital-to-analog converter circuits that people having ordinary skills in the art are familiar with. In other words, the invention does not intend to impose a specific limitation on this regard.

Figure 5:
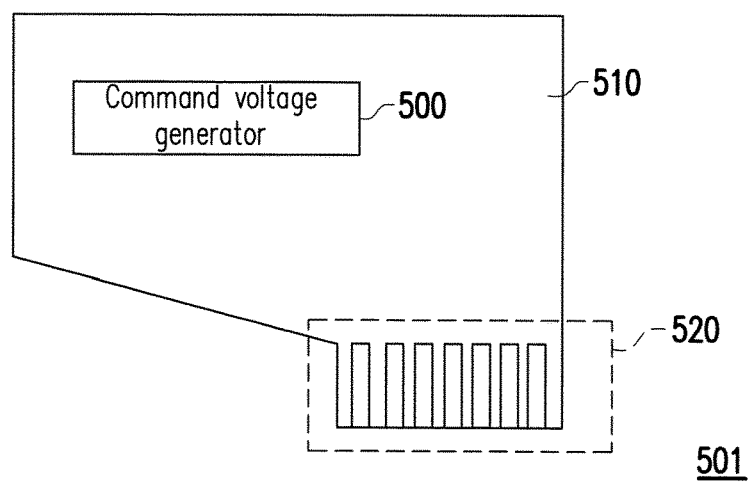
FIG. 5 is a schematic view illustrating a command voltage generator according to yet another embodiment of the invention.

Referring to FIG. 5, FIG. 5 is a schematic view illustrating a command voltage generator according to yet another embodiment of the invention. In FIG. 5, the command voltage generator 500 may be implemented on a circuit board 510 as a modularized apparatus (e.g., a command voltage generator module 501). A connector 520 is disposed on the circuit board 510. Moreover, the circuit board 510 may be detachably connected to the corresponding electricity aided bicycle through the connector 520. When at least one of the velocity estimation method or the electricity aid strategy of the electricity aided bicycle requires modification, such modification may be carried out by simply replacing the command voltage generator module 510. Hence, the manufacture and assembling of the electricity aided bicycle is facilitated.

The connector 520 may be a connector in an arbitrary form. The goldfinger-type connector shown in FIG. 5 merely serves as an example and is not intended to serve to limit the invention. Moreover, other circuit devices may also be disposed on the circuit board 510. The invention does not intend to impose a specific limitation on this regard.

Figure 6:
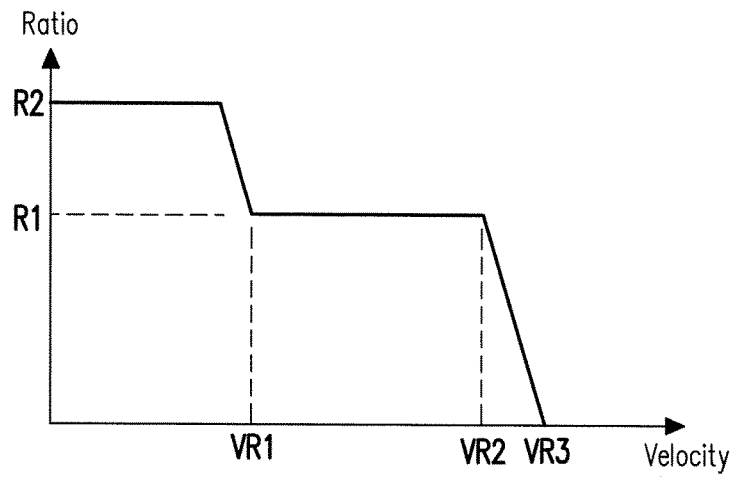
FIG. 6 is a schematic view illustrating an electricity aid strategy according to an embodiment of the invention.

Referring to FIG. 6, FIG. 6 is a schematic view illustrating an electricity aid strategy according to an embodiment of the invention. In an embodiment of the invention, during setting of the electricity aid strategy, a plurality of reference velocities VR1 to VR3 and a plurality of corresponding electricity aid ratios R1 to R2 may be set. In an example where the reference velocity VR1 is less than the reference velocity VR2, the reference velocity VR2 is less than the reference velocity VR3, and the electricity aid ratio R2 is greater than the electricity aid ratio R1, when the estimated velocity value is less than the reference velocity value VR1, the electricity aid strategy correspondingly provides the relatively greater electricity aid ratio R2, and when the estimated velocity value is between the reference velocity values VR1 and VR2, the electricity aid strategy correspondingly provides the relatively lower electricity aid ratio R1. When the estimated velocity value is greater than the reference velocity value VR2, the corresponding electricity aid ratio in the electricity aid strategy is 0.

Figure 7:
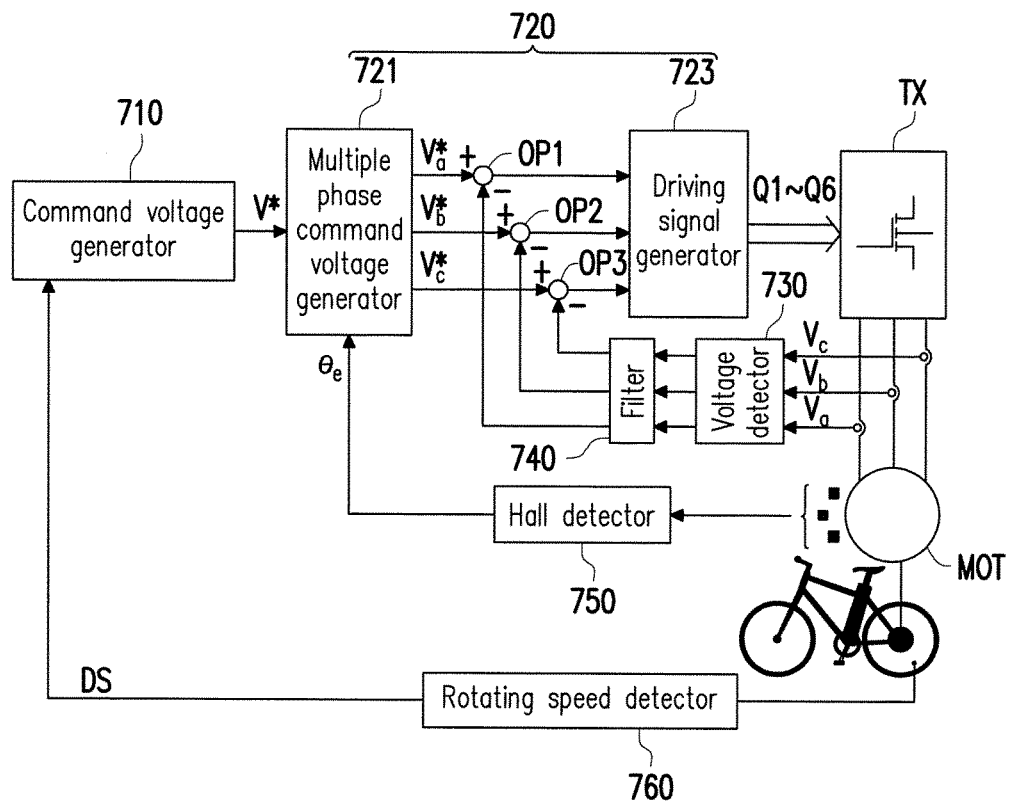
FIG. 7 is a schematic view illustrating an electricity aided bicycle according to another embodiment of the invention.

Referring to FIG. 7, FIG. 7 is a schematic view illustrating an electricity aided bicycle according to another embodiment of the invention. An electricity aided bicycle 700 includes a command voltage generator 710, a driving circuit 720, a voltage detector 730, a filter 740, a Hall detector 750, a rotating speed detector 760, and operators OP1 to OP3. The command voltage generator 710 generates a command voltage V* and provides the command voltage V* to the driving circuit 720. The driving circuit 720 includes a multiple phase command voltage generator 721 and a driving signal generator 722. The multiple phase command voltage generator 721 generates multiple phase command voltages $V_a^*$, $V_b^*$, and $V_c^*$ based on the command voltage V*, and provides the multiple phase command voltages $V_a^*$, $V_b^*$, and $V_c^*$ to the operators OP1 to OP3. The operators OP1 to OP3 respectively perform subtract operations between the multiple phase command voltages $V_a^*$, $V_b^*$, and $V_c^*$ and a plurality of feedback signals, and transmit generated operation results to the driving signal generator 722.

The driving signal generator 722 is configured to generate a plurality of driving signals Q1 to Q6 and drives a transistor Tx through the driving signals Q1 to Q6, thereby providing a driving voltage to the auxiliary motor MOT.

Moreover, the voltage detector 730 is coupled to the auxiliary motor MOT, detects a plurality of driving phase voltages $V_a$, $V_b$, and $V_c$ of the auxiliary motor MOT, and generates the feedback signals. The feedback signals are filtered at the filter 740 to filter out noises, and are provided to the operators OP1 to OP3 for the subtract operations.

Besides, the Hall detector 750 detects a rotation status $\theta_e$ of the auxiliary motor MOT, and transmits the detected rotation status $\theta_e$ to the multiple phase command voltage generator 721 as the basis for the multiple phase command voltage generator 721 to generate the multiple phase command voltages $V_a^*$, $V_b^*$, and $V_c^*$.

The rotating speed detector 760 detects the rotation status of the driving gear of the electricity aided bicycle 700 and generates the detection signal DS.

Figure 8:
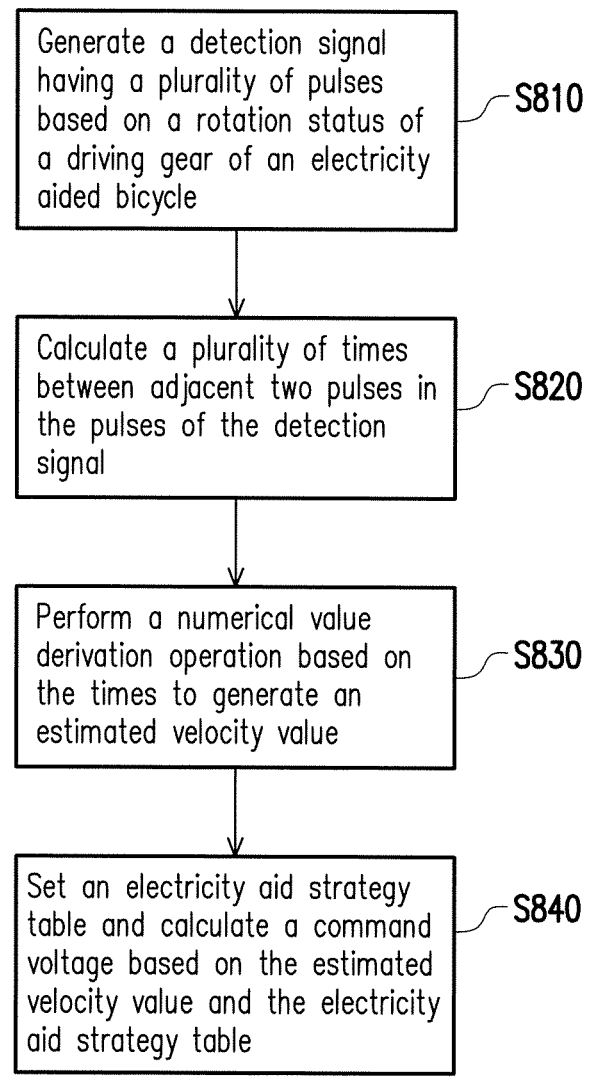
FIG. 8 is a flowchart illustrating an auxiliary power controlling method of an electricity aided bicycle according to an embodiment of the invention.

Referring to FIG. 8, FIG. 8 is a flowchart illustrating an auxiliary power controlling method of an electricity aided bicycle according to an embodiment of the invention. At Step S810, a detection signal having a plurality of pulses is generated based on a rotation status of a driving gear of the electricity aided bicycle. At Step S820, a plurality of times between two adjacent pulses in the pulses of the detection signal is calculated. At Step S830, a numerical value derivation operation is performed on the times to generate an estimated velocity value. Then, at Step S840, an electricity aid strategy table is set, and a command voltage is calculated based on the estimated velocity value and the electricity aid strategy table.

Details concerning the respective steps are already described in detail in the above embodiments and thus will not be repeated in the following.

In view of the foregoing, in the embodiments of the invention, the rotation status of the driving gear is detected to generate the detection signal having the pulses. In addition, the numerical value derivation operation is performed based on the times between the pulses of the detection signal, so as to generate a stable estimated velocity value. In addition, the electricity aid strategy table is set in the embodiments of the invention to provide the electricity aid ratio. Hence, the auxiliary motor is able to provide an appropriate auxiliary power more effectively, and the convenience of use and the safety of the electricity aided bicycle are facilitated.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electricity aided bicycle, comprising:
   a driving circuit, receiving a command voltage and driving an auxiliary motor of the electricity aided bicycle based on the command voltage;
   a rotating speed detector, generating a detection signal having a plurality of pulses based on a rotation status of a driving gear of the electricity aided bicycle; and
   a command voltage generator, coupled to the rotating speed detector and the driving circuit, receiving the detection signal, and configured to:
      calculate a plurality of times between two adjacent pulses in the pulses of the detection signal;
      perform a numerical value derivation operation based on the times to generate an estimated velocity value;
      set an electricity aid strategy table to calculate the command voltage based on the estimated velocity value and the electricity aid strategy table,
   wherein the electricity aid strategy table records a relation between an electricity aid ratio and the estimated velocity value,
   wherein the times comprise a first time, a second time, and a third time, the command voltage generator calculates a plurality of reciprocals of the first time, the second time, and the third time, and performs the numerical value derivation operation based on the third time and the reciprocals,
   wherein the estimated velocity value is equal to $$\frac{1}{T_K} + \frac{1}{2}\left[\frac{1}{T_K} - \frac{1}{T_{K-1}}\right] + \frac{T_K}{8}\left[\frac{\frac{1}{T_K} - \frac{1}{T_{K-1}}}{T_K} - \frac{\frac{1}{T_{K-1}} - \frac{1}{T_{K-2}}}{T_{K-1}}\right],$$

wherein $T_K$ is the third time, $T_{K-1}$ is the second time, and $T_{K-2}$ is the first time.

2. The electricity aided bicycle as claimed in claim 1, wherein the command voltage generator sets a detection cycle and periodically detects whether each of the pulses is generated in the detection signal based on the detection cycle.

3. The electricity aided bicycle as claimed in claim 2, wherein the detection cycle is one millisecond.

4. The electricity aided bicycle as claimed in claim 1, wherein the command voltage generator comprises:
   a processor, calculating the times, performing the numerical value derivation operation based on the times to generate the estimated velocity value, and calculating the command voltage based on the electricity aid strategy table and the estimated velocity value; and
   a lookup table, coupled to the processor, storing the electricity aid strategy table, and providing the electricity aid strategy table to the processor.

5. The electricity aided bicycle as claimed in claim 4, wherein the command voltage generator further comprises:
   a filter, coupled to the processor, receiving and filtering the detection signal, and providing a filtered detection signal to the processor.

6. The electricity aided bicycle as claimed in claim 1, wherein the electricity aid ratio is negatively proportional to the estimated velocity value.

7. The electricity aided bicycle as claimed in claim 1, wherein in the electricity aid strategy table, the estimated velocity value less than a first reference velocity value corresponds to a first electricity aid ratio, the estimated velocity value between the first reference velocity value and a second reference velocity value corresponds to a second electricity aid ratio, and the estimated velocity value greater than the second reference velocity value corresponds to a third electricity aid ratio,
   wherein the first reference velocity value is less than the second reference velocity value, the first electricity aid ratio is greater than the second electricity aid ratio, and the second electricity aid ratio is greater than the third electricity aid ratio.

8. The electricity aided bicycle as claimed in claim 1, wherein the driving circuit comprises:
   a multiple phase command voltage generator, coupled to the command voltage generator and generating a plurality of multiple phase command voltages; and
   a driving signal generator, coupled to the multiple phase command voltage generator and generating a plurality of driving signals based on the phase command voltages to drive the auxiliary motor.

9. The electricity aided bicycle as claimed in claim 1, wherein the driving circuit further comprises:
   a voltage detector, coupled to the auxiliary motor, detecting a plurality of driving phase voltages of the auxiliary motor and generating a plurality of feedback signals; and
   an operator, coupled to the multiple phase command voltage generator and the voltage detector, respectively performing an operation between the phase command voltages and the feedback signals, and providing a plurality of after-operation phase command voltages to the driving signal generator.

10. The electricity aided bicycle as claimed in claim 1, wherein the command voltage generator is disposed on a circuit board, and the circuit board is detachably coupled to the electricity aided bicycle.

11. An auxiliary power controlling method, adapted for an electricity aided bicycle, comprising:
   receiving a command voltage and driving an auxiliary motor of the electricity aided bicycle based on the command voltage by a driving circuit;
   generating a detection signal having a plurality of pulses based on a rotation status of a driving gear of the electricity aided bicycle;
   calculating a plurality of times between two adjacent pulses in the pulses of the detection signal, wherein the times comprise a first time, a second time, and a third e;
   performing a numerical value derivation operation based on the times to generate an estimated velocity value, comprises:
      calculating a plurality of reciprocals of the first time, the second time, and the third time; and
      performing the numerical value derivation operation based on the third time and the reciprocals;

setting an electricity aid strategy table to calculate the command voltage based on the estimated velocity value and the electricity aid strategy table, wherein the electricity aid strategy table records a relation between an electricity aid ratio and the estimated velocity value, wherein the estimated velocity value is equal to $$\frac{1}{T_K} + \frac{1}{2}\left[\frac{1}{T_K} - \frac{1}{T_{K-1}}\right] + \frac{T_K}{8}\left[\frac{\frac{1}{T_K} - \frac{1}{T_{K-1}}}{T_K} - \frac{\frac{1}{T_{K-1}} - \frac{1}{T_{K-2}}}{T_{K-1}}\right],$$

wherein TK is the third time, TK−1 is the second time, and TK−2 is the first time.

12. The auxiliary power controlling method as claimed in claim 11, wherein calculating the times between two adjacent pulses in the pulses of the detection signal comprises:
setting a detection cycle and periodically detecting whether each of the pulses is generated in the detection signal based on the detection cycle.

13. The auxiliary power controlling method as claimed in claim 11, wherein the electricity aid ratio is negatively proportional to the estimated velocity value.

14. The auxiliary power controlling method as claimed in claim 11, wherein setting the electricity aid strategy table comprises:
setting a first reference velocity value and a second reference velocity value; and
setting that the estimated velocity value less than the first reference velocity value corresponds to a first electricity aid ratio, the estimated velocity value between the first reference velocity value and the second reference velocity value corresponds to a second electricity aid ratio, and the estimated velocity value greater than the second reference velocity value corresponds to a third electricity aid ratio,
wherein the first reference velocity value is less than the second reference velocity value, the first electricity aid ratio is greater than the second electricity aid ratio, and the second electricity aid ratio is greater than the third electricity aid ratio.

* * * * *